United States Patent
Foster et al.

[15] 3,648,193
[45] Mar. 7, 1972

[54] MODE-LOCKED FREQUENCY DOUBLED LASER

[72] Inventors: Jack D. Foster, Los Altos; Larry M. Osterink, Mountain View, both of Calif.

[73] Assignee: Sylvania Electric Products Inc.

[22] Filed: July 2, 1969

[21] Appl. No.: 838,440

[52] U.S. Cl. ............................................331/94.5, 330/4.3
[51] Int. Cl. ..........................................................H01s 3/10
[58] Field of Search ..................................331/94.5; 330/4.3

[56] References Cited

UNITED STATES PATENTS 3,412,251    11/1968    Hargrove ..........................331/94.5 X

OTHER PUBLICATIONS

Wright, " Enhancement of Second Harmonic... Laser Cavity," Proc. IEEE, Vol. 51, No. 11, Nov. 1963, p. 1663.
Bass et al., " Reproducible...Mode Locked Laser," IEEE J. Quantum Electr. Vol. QE–3 No. 11, Nov. 1967, pp. 621– 6.
Kohn et al., " Second Harmonic...Laser," Applied Phys. Lett., Vol. 8, No. 9, 1 May 1966, pp. 231– 233.
Soffer et al., " Modulation of...Condition," Physics Letters, Vol. 24A, No. 5, 27 Feb. 1967, pp. 282– 3.

*Primary Examiner*—Ronald L. Wibert
*Assistant Examiner*—R. J. Webster
*Attorney*—Norman J. O'Malley, John F. Lawler and Russell A. Cannon

[57] ABSTRACT

This laser comprises an intracavity nonlinear crystal that converts fundamental frequency laser light to second harmonic light and is also modulated to mode lock the laser. The modulation voltage, and thus the modulation depth, is varied to optimize the magnitude of the second harmonic power produced by the crystal.

5 Claims, 5 Drawing Figures

Patented March 7, 1972

3,648,193

INVENTORS
JACK D. FOSTER
LARRY M. OSTERINK

BY *Russell A. Cannon*

AGENT

3,648,193

MODE-LOCKED FREQUENCY DOUBLED LASER

BACKGROUND OF THE INVENTION

This invention relates to lasers and more particularly to a mode-locked frequency doubled laser.

When light enters a crystal, it induces a dipole in the crystal that absorbs and then reradiates an incident photon. This action causes a decrease in the transit time of the light through the crystal and accounts for the indices of refraction and changes in the polarization of the light by birefringent crystals. In nonlinear crystals such as barium sodium niobate ($Ba_2NaNb_5O_{15}$) and lithium niobate ($LiNbO_3$), however, the induced polarization in the crystal has a component proportional to the square of the incident optical field. It is therefore possible to obtain second harmonic generation or frequency doubling with these nonlinear crystals since a dipole induced therein can absorb two incident photons and then reradiate one photon of twice the energy, i.e., twice the frequency, of the incident signal. This process can be made quite efficient by phase matching the generated harmonic signal with the incident signal by using the birefringence of the crystal to compensate for dispersion. In order to increase the probability of an induced dipole generating a second harmonic photon, it is necessary to increase the probability that the dipole will absorb two incident photons almost simultaneously. The latter probability may be increased by placing the nonlinear crystal inside the laser cavity where the optical field strengths (i.e., photo densities) are large. Also, this may be accomplished by increasing the density of incident photons in either the spatial or the time domain.

When second harmonic light is generated in the laser cavity, the frequency-doubled light operates as a loss to the cavity. Stated differently, the fundamental laser photons converted into second harmonic photons are no longer available to stimulate emission in the lasing medium. If the number of fundamental frequency photons that are converted to second harmonic photons is too great, the intracavity laser loss will be greater than the gain and lasing will be extinguished. Thus, there is an optimum amount of coupling of fundamental photons into second harmonic photons. In general, the optimum percentage conversion of fundamental laser light into second harmonic light is equal to the optimum mirror transmission loss of the laser.

A prior art technique for optimizing the coupling of fundamental photons to second harmonic photons is to change the laser beam diameter by varying the curvature and/or axial spacing of the laser cavity mirrors. These variations cause a change in the power density of the fundamental laser beam in the nonlinear crystal until maximum second harmonic power output is obtained as indicated, for example, on a power meter. This technique requires precise mechanical adjustments and optical control which is difficult to achieve due to complicated thermal optical effects in the crystal and laser rod.

SUMMARY OF INVENTION

An object of this invention is the provision of a simple method of enhancing generation of second harmonic light in a frequency doubled laser. Another object is the provision of a simple and improved method of adjusting a frequency-doubled laser for optimizing the magnitude of second harmonic power generated thereby.

In accordance with this invention, a frequency-doubled laser is mode locked to bunch the laser photons and thus increase the probability of generating second harmonic light. The modulation voltage for mode locking the laser is varied to optimize the generation of second harmonic light.

DESCRIPTION OF PREFERRED EMBODIMENTS

Figure 1:
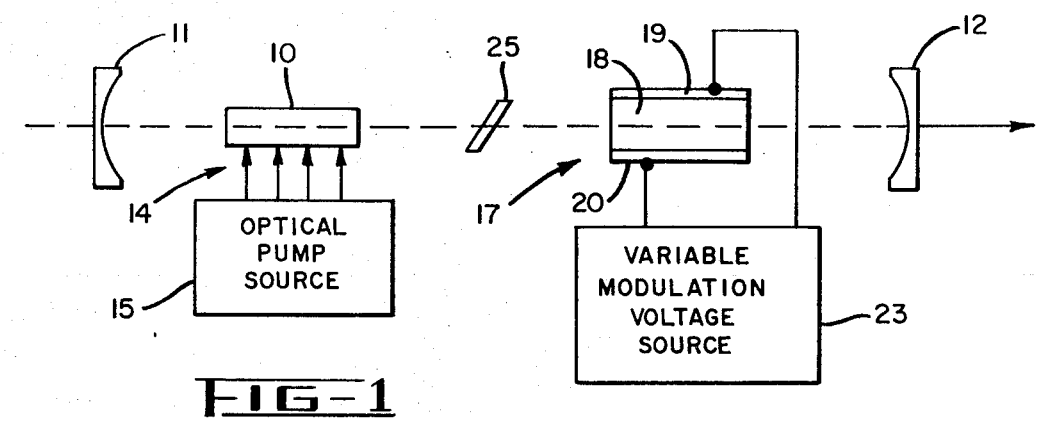
FIG. 1 is a schematic block diagram of laser embodying this invention.

The mode-locked laser illustrated in FIG. 1 comprises an active laser material 10 located in a high-Q resonant cavity defined by mirrors 11 and 12 which are spaced from opposite ends of the laser material. Mirror 11 is totally reflecting at the fundamental laser frequency and the second harmonic thereof. Mirror 12 is totally reflecting at the fundamental laser frequency. It is totally transmitting, however, at the second harmonic of the fundamental laser frequency. The laser material may, by way of example, be a cylindrical rod of yttrium aluminum garnet which is doped with neodymium. Light rays 14 from an optical pump source 15 excite the neodymium atoms to produce a population inversion and lasing in the rod 10. The pump source may be a tungsten filament or an arc lamp that is operated continuously.

An optical modulator 17 is also located in the cavity and is axially aligned with the laser rod and the mirrors. The modulator comprises a rectangular electro-optic crystal 18 having planer parallel electrodes 19 and 20 bonded to opposite sides thereof. The electrodes are electrically connected to terminals of a source 23 of variable modulation voltage. Source 23 comprises a tunable radiofrequency oscillator which produces a variable frequency sinusoidal modulation voltage. The modulation frequency is tuned to the laser inter mode frequency $c/2L$, where $c$ is the velocity of light and $L$ is the cavity length, to mode lock the laser.

Figure 2:
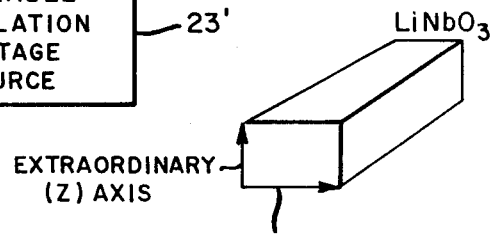
FIG. 2 is a schematic diagram illustrating the orientation of the nonlinear crystal in the laser cavity of FIG. 1.
Figure 3:
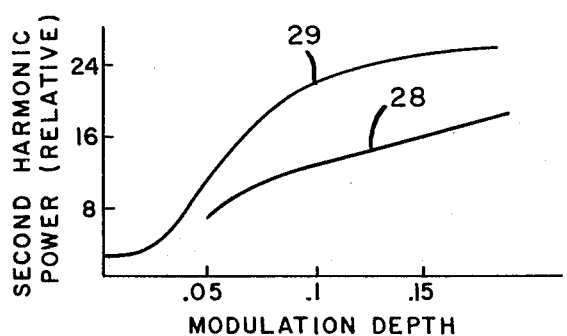
FIG. 3 is a graph illustrating the enhancement in generated second harmonic light as a result of mode locking the laser.

The electro-optic crystal 18 must simultaneously operate as a frequency doubler to generate second harmonic light and a phase modulator to mode lock the laser. Thus, the crystal must have a nonlinear effect along at least one axis thereof to produce second harmonic light. The crystal must also have an electro-optic effect associated with the same axis in order to produce a phase retardation and mode lock the laser. Such crystals are described by J. E. Geusic et al. in the article, "The Nonlinear Optical Properties of $Ba_2NaNb_5O_{15}$," Applied Physics Letters, Vol. 11, page 269, (1 Nov. 1967), and Vol. 12, page 224, (15 Mar. 1968). By way of example, crystal 18 may be a rectangular crystal of barium sodium niobate or lithium niobate. The specific orientation of a lithium niobate crystal in the laser cavity is illustrated in FIG. 2. The extraordinary axis of the crystal is aligned with the applied electric field (i.e., orthogonal to the planes of the electrodes 19 and 20). The ordinary axis of the crystal is aligned orthogonal to the longitudinal axis of the laser and orthogonal to the electric field in the crystal. A Brewster polarizer 25 is located in the cavity between the laser medium and the crystal to produce high loss for extraordinary polarization and low loss for ordinary polarization. This causes the laser to oscillate with ordinary fundamental waves which phase match with generated extraordinary second harmonic waves.

The electric field applied to the crystal has a frequency substantially equal to the laser intermode frequency $c/2L$ in order to mode lock the laser and thereby to enhance the generation of second harmonic photons and frequency doubling. The number of laser cavity modes that are locked depends upon the modulation depth (applied field and coincidence with $c/2L$). Many locked modes produce tight bunching of laser photons and maximum second harmonic conversion. Fewer locked modes reduces the second harmonic conversion. The modulation voltage on the crystal, therefore, provides control of the second harmonic generation to optimumly couple power from the laser.

The optimum second harmonic power obtainable with a particular laser material and nonlinear crystal is determined experimentally. The power may be varied by adjusting the cavity length or the radius of curvature of the cavity mirrors until it is optimum. Since all crystals and laser rods do not have the same characteristics, it is difficult to build several lasers that are identical. It is therefore desirable to have a means of conveniently tuning a packaged laser having a fixed physical structure to produce optimum second harmonic power.

In accordance with this invention, the laser cavity is designed so that the second harmonic power produced thereby is approximately optimum. The modulation voltage is then tuned to the laser intermode frequency $c/2L$ to mode lock the laser. This causes the output of the laser to be a train of optical pulses which are temporally bunched photons that enhance the probability of a second harmonic photon being generated. Curves 28 and 29 illustrate the second harmonic power enhancement produced by mode locking a multitransverse mode laser and a single spatial mode laser, respectively, as a function of the peak single pass phase retardation or modulation depth $\delta_c$. Curves 28 and 29 reveal that a significant increase or enhancement in second harmonic power is obtained by mode locking the laser. The enhancement is shown relative to a free running nonmode-locked laser.

Figure 4:
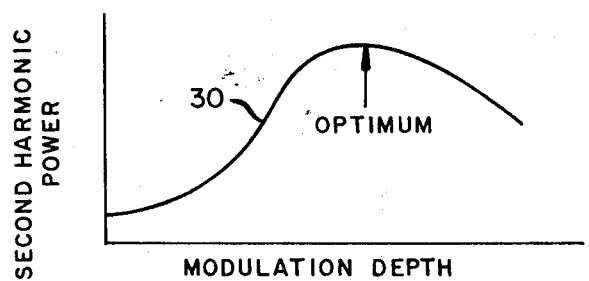
FIG. 4 is a graph illustrating the variation in generated second harmonic power as a function of modulation depth.

The magnitude of the modulation voltage, and thus the modulation depth, is varied to obtain optimum generation of second harmonic light. The variation in the power of the second harmonic light as a function of the modulation depth is represented by curve 30 in FIG. 4. The frequency of the modulation voltage could also be varied slightly to accomplish the same result.

Figure 5:
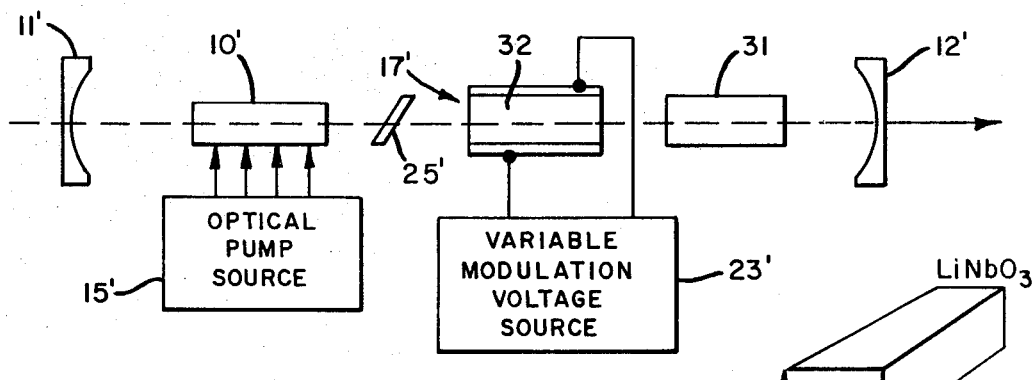
FIG. 5 is a schematic block diagram of a modified form of this invention.

A modified form of this invention is illustrated in FIG. 5 wherein primed reference characters refer to similar components in the laser in FIG. 1. The lasers illustrated in FIGS. 1 and 5 are similar except that the latter comprises a nonlinear crystal 31 for producing second harmonic light and an electro-optic crystal 32 for mode locking. The crystals are located in the cavity and are axially aligned with the laser rod 10' and the cavity mirrors 11' and 12'.

What is claimed is:

1. The method of doubling the optical frequency of a laser consisting of the steps of:
   positioning a single nonlinear crystal in the intracavity path of the laser beam, and suitably modulating said crystal to produce mode locking and frequency doubling of the laser beam.

2. Apparatus for producing a laser beam having a frequency that is the second harmonic of the fundamental laser frequency comprising,
   a laser oscillator comprising a laser medium and spaced mirrors defining a laser-resonant cavity of predetermined length determinative of the fundamental frequency of the laser beam, and
   a single electro-optic crystal disposed within said cavity for simultaneously mode locking said beam and for interacting with the latter to produce the optical second harmonic thereof, and means for electrically modulating said crystal.

3. The apparatus according to claim 2 in which one of said mirrors is totally reflecting for a laser beam at both the fundamental frequency and the second harmonic thereof, the other of said mirrors being totally reflecting for a laser beam at the fundamental frequency and at least partially transmitting at the second harmonic thereof.

4. The apparatus according to claim 2 in which said crystal is a birefringent element, having an ordinary axis and an extraordinary axis,
   a polarizer within said cavity aligned with the laser beam,
   said polarizer having a polarization plane aligned with one of said axes of said element whereby the fundamental mode of the laser beam oscillates in the plane of said polarizer and the second harmonic thereof oscillates in the plane of the other of said element axes.

5. The apparatus according to claim 2 wherein the means for electrically modulating comprises a source of modulation voltage having a frequency approximately equal to the difference between the frequencies of adjacent modes in the laser beam,
   means for coupling said voltage from the modulation source to said optical means for mode locking said laser beam, and
   means for varying said modulation voltage for adjusting the magnitude of the power in the second harmonic of the laser beam.

* * * * *